Figure 1:
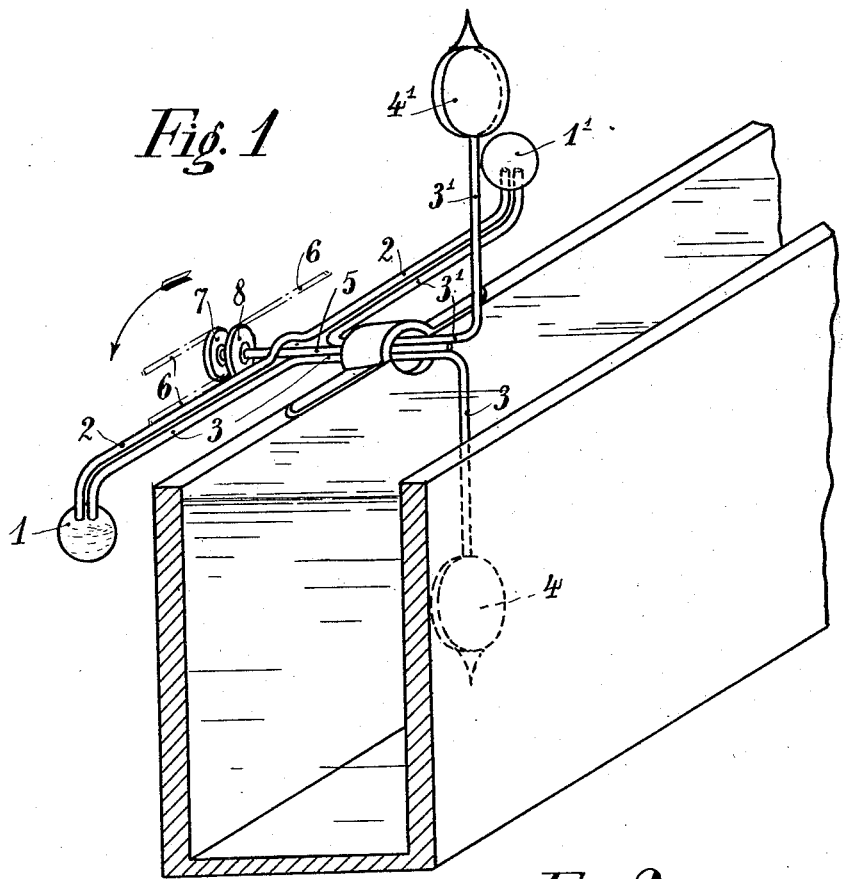

V. FIORIO.
HEAT ENGINE.
APPLICATION FILED JULY 1, 1914.

1,115,524.

Patented Nov. 3, 1914.

Witnesses:
E. Leckert,
M. J. L. Higgins.

Inventor.
Virginio Fiorio,
By Henry Orth Jr. atty.

ically; the contraction
UNITED STATES PATENT OFFICE.

VIRGINIO FIORIO, OF TURIN, ITALY.

HEAT-ENGINE.

1,115,524. Specification of Letters Patent. Patented Nov. 3, 1914.

Application filed July 1, 1914. Serial No. 848,461.

*To all whom it may concern:*

Be it known that I, VIRGINIO FIORIO, a subject of the King of Italy, residing at and whose postal address is 7 Corso Dante, Turin, Italy, have invented certain new and useful Improvements in Heat-Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object an apparatus for collecting the energy of the force of gravity by employing the difference of temperature between the water (or another liquid) and the upper air (or another gas).

The apparatus consists of two vessels arranged at the same distance from a horizontal axle and connected together by means of a tube secured to said axle. These tight closed vessels are connected, by means of suitable tubes, with two hollow bodies, preferably of lenticular shape, placed at the same distance from the same horizontal axle and perpendicular to the connecting tube of the two vessels. The vertical plane of the said lenticular bodies is parallel to the plane of the vessels but at such a distance therefrom to allow (the horizontal axle being mounted on suitable bearings and perpendicular to the edge of the wall of a tank containing the water or other liquid) the lenticular bodies to revolve successively and alternatively in the water and in the air and the vessels to revolve freely and continually in the air. One of said vessels is filled almost to the rim with a liquid preferably somewhat volatile; and the vacuum is produced in the interior of the apparatus. It will be seen that, when one of the two lenticular bodies passes from the air into the water (while the other lenticular body leaves the water to pass into the air), the temperature of the vapors of the liquid contained in the first lenticular body will sink owing to the lower temperature of the water; the contraction of said vapors will cause all the liquid contained in the vessel connected with the other lenticular body to be drawn into the vessel connected with the lenticular body plunged in the water. The liquid thus conveyed in one of the vessels will act by its own weight causing the whole apparatus to turn on its axle; as soon as the said vessel has reached its lowest position, the other lenticular body, which has become heated during its rotation in the air, will plunge into the water (from which the other lenticular body will come out at the same time) causing, in the same manner as before described, the liquid to be transferred up into the vessel connected therewith and effecting the rotation, by force of gravity, in the same direction as before. Thus I will obtain a continuous rotation of the apparatus produced by the force of gravity of the liquid, which at each rotation of 180° enters successively that of the two vessels which is in the highest position.

Figure 2:
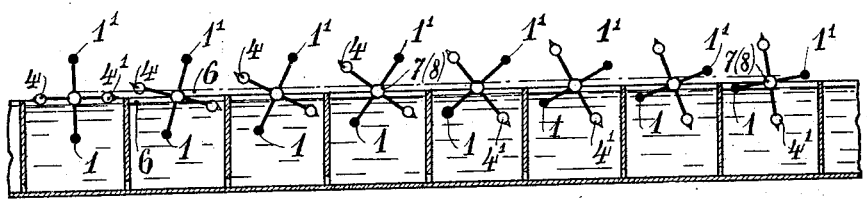

This apparatus is shown by way of example in the annexed drawing. Figure 1 is a perspective view thereof showing the principle on which it works. Fig. 2 is a diagrammatic view of a modified part of the apparatus by which a more regular and even work is effected.

1 and 1' indicate the vessels (having the form of balls in the drawing), which are connected together by means of the tube 2; the vessel 1 is in communication, by means of the tube 3, with the lenticular body 4, and the vessel 1' is connected, through the tube 3', with the lenticular body 4'.

In Fig. 1 it is assumed that the lenticular body 4 has already effected half a rotation in the water and has caused all the liquid (suitably ether) before contained in the vessel 1' to pass into the vessel 1 communicating therewith. This liquid, acting by gravity, will cause the apparatus to rotate in the direction of the arrow about its horizontal axle 5; the immersion of the lenticular body 4' in the liquid will produce in the same manner the passage of all the liquid into the vessel 1' and its consequent action of gravity effecting the rotation of the apparatus in the same direction.

In order to obtain a regular and even motion it is necessary to arrange in series a certain number of said apparatus (Fig. 2) slightly out of phase one to another and connected together in any suitable manner, for instance by means of ropes —6— wound on pulleys keyed on the axles 5; on each of said axles two pulleys 7 and 8 will be secured, one of which as 7 receives the motion from the preceding apparatus while the other 8 transmits the same to the next one. On each axle 5 any number of pairs of vessels 1, 1' and lenticular bodies 4, 4' may be arranged; moreover the connecting tubes 2, 3, 3' may be secured to any point of the vessels 1, 1' and lenticular bodies 4, 4' without departing from the principle of this invention.

What I claim is:

1. A heat engine, comprising a pair of closed communicating vessels arranged to revolve about an axis at substantially the same distance therefrom, oppositely disposed hollow bodies communicating with said vessels adapted to revolve about said axis in a vertical plane parallel to the plane of the vessels, said vessels containing a volatile liquid, and means to automatically and alternately cool said bodies, for the purpose specified.

2. In an apparatus for collecting the energy of the force of gravity by employing the difference of temperature between the water (or other liquid) and the atmospheric air, a number of pairs of tight closed vessels arranged at opposite sides and at the same distance from a horizontal axle and communicating together and with pairs of hollow bodies, preferably of lenticular form, disposed also at opposite sides and perpendicularly to the vessels in a vertical plane parallel with but at a certain distance from the plane containing the said vessels; these latter containing a liquid easily volatile and the vacuum being produced in the interior of the whole apparatus; the apparatus being mounted on bearings and having its axle on the edge of the wall of a tank containing the water or other liquid so that the lenticular bodies rotate alternatively in the water (or other liquid) and in the air, while the vessels rotate continually in the air.

In testimony that I claim the foregoing as my invention, I have signed my name in presence of two subscribing witnesses.

VIRGINIO FIORIO.

Witnesses:
 LIZFERUCCIO YECOBACCI,
 MARIA CARDILLO.

Copies of this patent may be obtained for five cents each, by addressing the "Commissioner of Patents. Washington, D. C."